United States Patent
Beard et al.

(10) Patent No.: US 8,960,081 B2
(45) Date of Patent: Feb. 24, 2015

(54) STEAM COOKING APPARATUS

(75) Inventors: Guy Beard, Jacksonville, FL (US); Michael Johnigean, Jacksonville, FL (US)

(73) Assignee: Innovative Product Development, LLC, Jacksonville, FL (US)

( * ) Notice: Subject to any disclaimer, the term of this patent is extended or adjusted under 35 U.S.C. 154(b) by 844 days.

(21) Appl. No.: 12/804,523

(22) Filed: Jul. 23, 2010

(65) Prior Publication Data

US 2011/0023724 A1 Feb. 3, 2011

Related U.S. Application Data

(60) Provisional application No. 61/271,601, filed on Jul. 23, 2009.

(51) Int. Cl.
A47J 27/06 (2006.01)
A47J 27/04 (2006.01)

(52) U.S. Cl.
CPC .................................. *A47J 27/04* (2013.01)
USPC ............................................. 99/340; 99/342

(58) Field of Classification Search
USPC ........... 99/339–341, 403, 410–413, 417, 450; 210/533
See application file for complete search history.

(56) References Cited

U.S. PATENT DOCUMENTS

| | | | |
|---|---|---|---|
| 61,478 A | 1/1867 | Smith | |
| 166,120 A | 7/1875 | Malin | |
| 608,144 A | 7/1898 | Porter | |
| 936,965 A | 10/1909 | Wells | |
| 1,021,133 A | 3/1912 | Chaloud, Jr. | |
| 1,281,943 A | 10/1918 | Gonsalves | |
| 1,379,072 A | 5/1921 | Winkelman | |
| 1,408,256 A | 2/1922 | Boehl | |
| 2,666,551 A | 1/1954 | Wyman | |
| 2,932,293 A | 4/1960 | Rassieur | |
| 3,704,663 A | 12/1972 | Shull et al. | |
| 3,808,963 A | 5/1974 | Ludena | |
| 4,317,017 A * | 2/1982 | Bowen | 219/729 |
| 4,488,479 A | 12/1984 | Sloan et al. | |
| 4,646,717 A * | 3/1987 | Baggioli | 126/376.1 |
| 4,677,905 A * | 7/1987 | Johnson | 99/413 |
| 4,739,698 A * | 4/1988 | Allaire | 99/410 |
| 5,438,916 A * | 8/1995 | Dornbush et al. | 99/448 |
| 5,662,026 A * | 9/1997 | Prakasa | 99/413 |
| 5,988,045 A | 11/1999 | Housley | |
| 6,196,120 B1 | 3/2001 | Reames | |
| 6,431,059 B1 | 8/2002 | Castellani | |
| 2008/0206437 A1 * | 8/2008 | Perry | 426/614 |

* cited by examiner

*Primary Examiner* — Brian Jennison
(74) *Attorney, Agent, or Firm* — Thomas C. Saitta

(57) ABSTRACT

A steam cooking apparatus having a water retaining member and a reversible steamer insert member, the steamer insert member having a perforated main body defining two steaming surfaces, the first surface provided with upstanding annular forming walls for forming patties, the second surface being flat and unobstructed.

19 Claims, 5 Drawing Sheets

STEAM COOKING APPARATUS

This application claims the benefit of U.S. Provisional patent application Ser. No. 61/271,601, filed Jul. 23, 2009.

BACKGROUND OF THE INVENTION

This invention relates generally to the field of cooking implements, and more particularly to the field of cooking implements comprising pans, pots, skillets or similar implements wherein a quantity of water can be heated to become steam, and even more particularly applies to such cooking implements wherein food is cooked using steam.

Items as described in general above are well known and are typically referred as "steamers" or "steam cookers". The use of steam to cook foods for consumption, as opposed to the process for sterilization of food, has long been known. The use of steam provides a moist, high-temperature environment in which to cook many food items, including meats, vegetables, seafood, eggs, etc. In steam cooking, the food is not placed into fatty oils or butters which add unnecessary and unhealthy calories and substances to the food, nor is the food subject to charring that may occur from grilling, barbequing or other cooking methods where the food directly contacts flame or hot metal, which charring may result in the formation of carcinogens in the food. Furthermore, steam cooking allows for fats and oils present in the food product to drain away, thereby reducing the amount of unhealthy components naturally present in the food.

It is an object of this invention to provide a novel, distinct and improved steam cooking apparatus and system over and above the known apparatuses and systems.

SUMMARY OF THE INVENTION

The invention is a steam cooking apparatus comprising a water retaining member that can be heated by placing the member onto the burner of a stove or is self-heating such that water retained within the member is converted into steam, such as a cooking pan, pot, skillet or the like, a reversible steamer insert member which supports the food during the cooking process, and a cover or lid member, the cover member being apertured so as to allow a quantity of steam to escape. The reversible steamer insert member is structured so as to mate or nest with or rest upon the water retaining member, and the cover member is adapted to mate or nest with or rest upon either the steamer insert member or the water retaining member.

The reversible steamer insert member has a generally planar main body with first and second steaming surfaces, the main body having a large number of perforations, apertures, holes, slots or the like extending therethrough. A handle, either permanently or removably affixed, extends generally horizontally from the main body. The first steaming surface has a generally flat horizontal surface with a plurality of circular upstanding forming walls extending therefrom, the forming walls defining forming compartments to receive ground beef, other chopped meats, vegetables, etc. such that patties may be formed by pressing the food substance into the forming compartment. The walls also act as separators to define cooking compartments for differing food items. Preferably, the forming walls interconnect such that areas of the first steaming surface external to the forming compartments define irregularly shaped cooking compartments. The second steaming surface is a generally flat surface with no upstanding walls such that large items may be steamed upon this surface when the steamer insert is disposed with this second steaming surface on top.

The reversible steamer insert is provided with nesting means for positioning the steamer insert in a spaced relationship to the bottom of the water retaining member, such that a quantity of water can be retained therein without contacting the steamer insert member. Such nesting means may comprise for example legs extending from both sides of the main body, extension members extending generally horizontally from the main body adapted so as to rest on the upper rim of the walls of the water retaining member, or preferably, a peripheral wall or walls extending about the main body, the peripheral wall or walls defining a first and second annular shoulder or a first and second channel, both adapted to mate with, nest with or rest on the upper rim of the water retaining member and to mate with, nest with or receive the lower rim of the cover member.

In another alternative embodiment, the steam cooking apparatus may further comprise one or more peripheral riser members that may be disposed between the reversible steamer insert and the cover member to allow for cooking thick foods, such as for example a whole chicken. The peripheral riser members are structured to mate with, nest with or rest on or receive the cover member, the steamer insert member or other peripheral riser members. In another alternative embodiment, a double boiler assembly may be provided in place of the standard cover member.

DETAILED DESCRIPTION OF THE INVENTION

Figure 1:
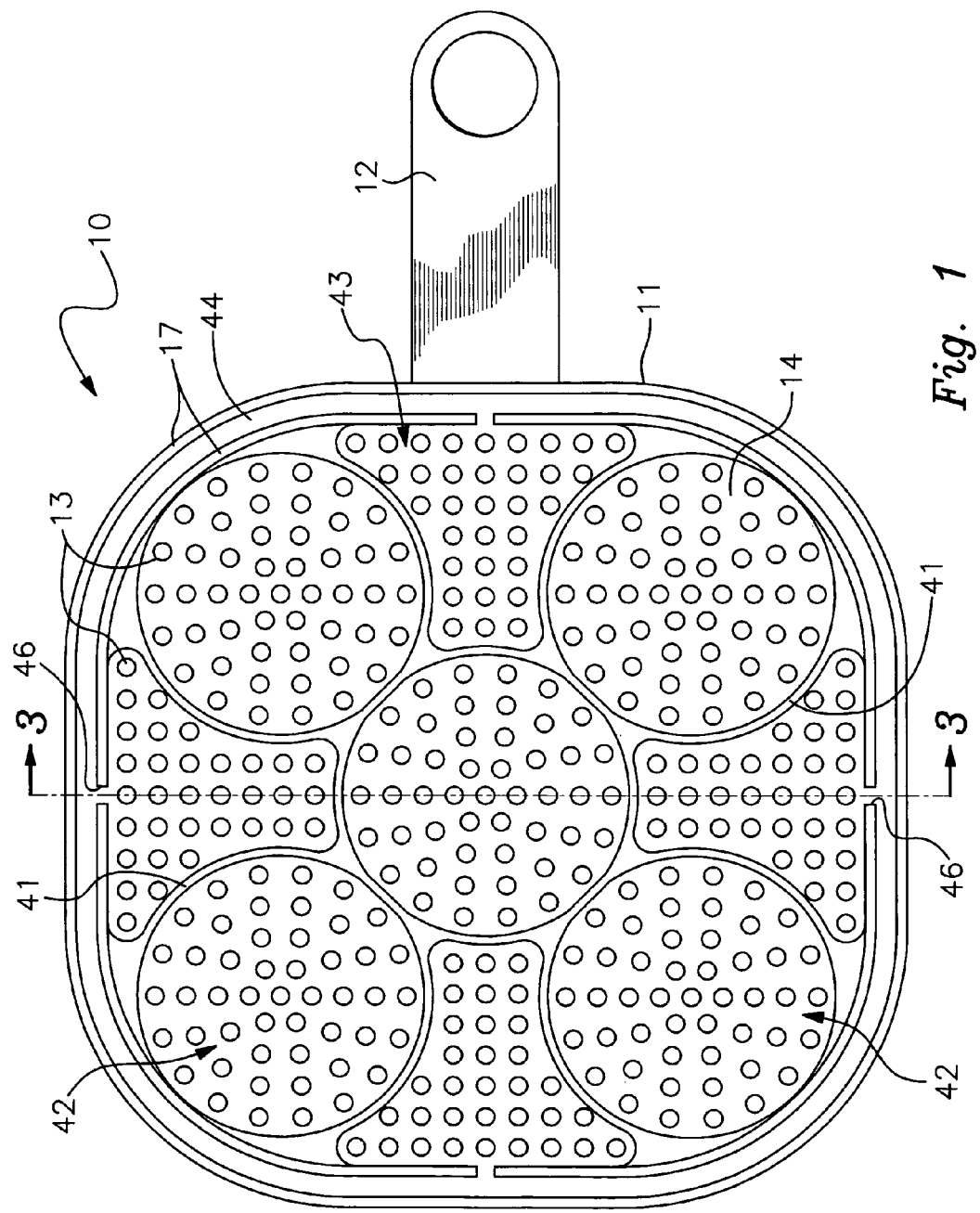
FIG. 1 is a view of the reversible steamer insert member showing the first steaming surface and the forming walls.
Figure 2:
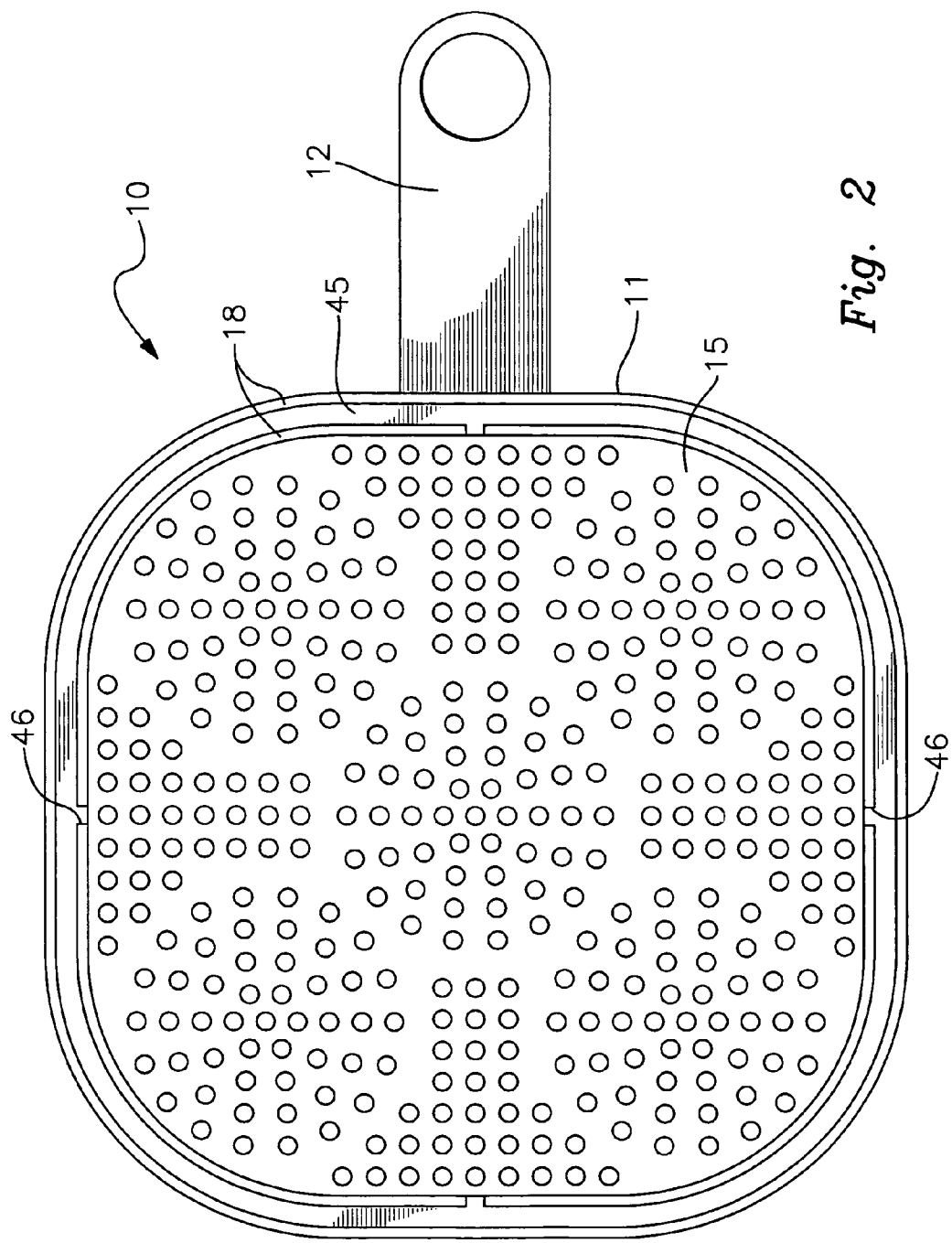
FIG. 2 is a reverse view of the reversible steamer insert member of FIG. 1 showing the second steaming surface.
Figure 3:
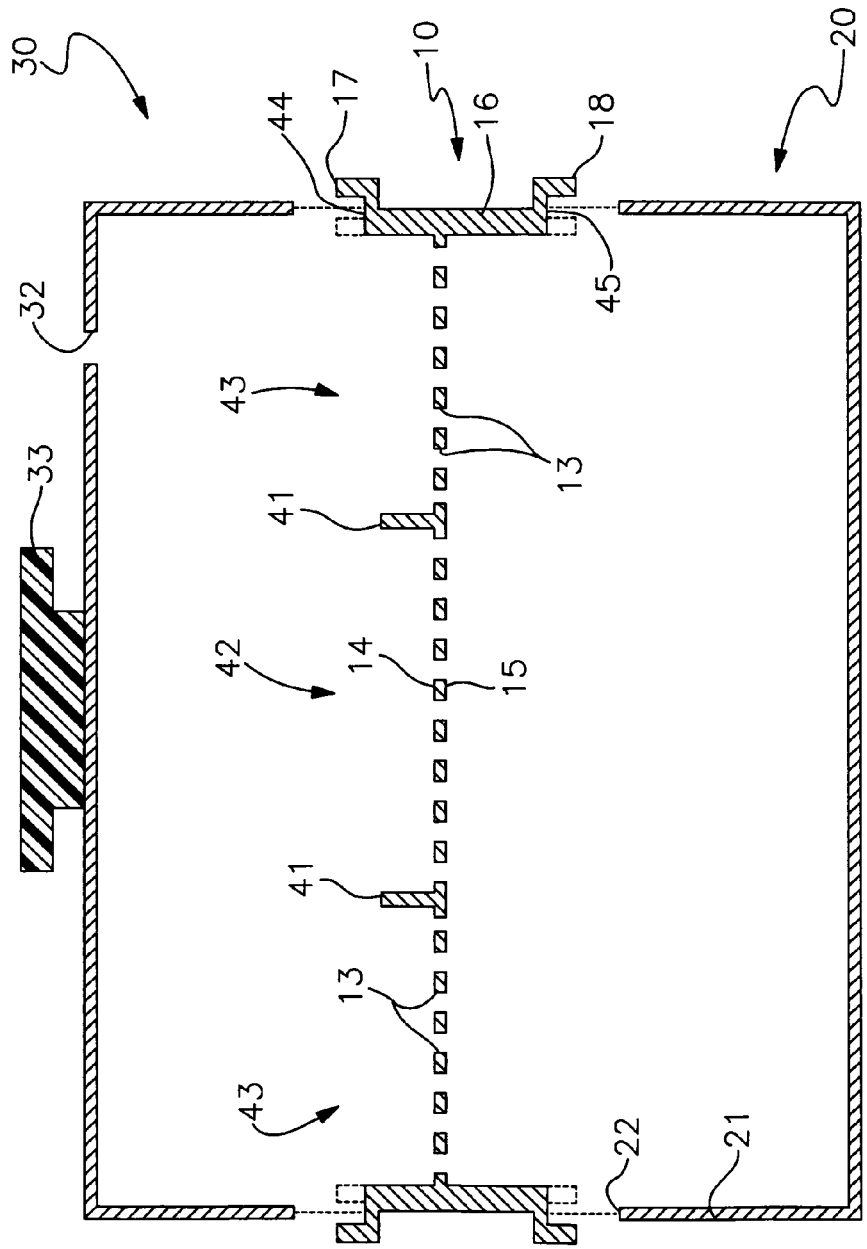
FIG. 3 is a cross-sectional view of the reversible steamer insert member taken along line III-III of FIG. 1 with the addition of a cover member and water retaining member.
Figure 4:
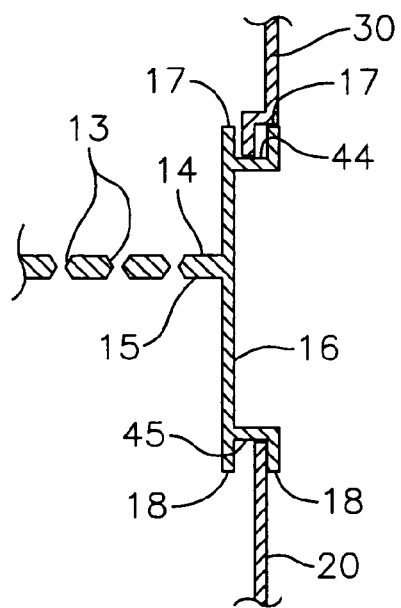
FIG. 4 is a partial cross-sectional view of an embodiment of the reversible steamer insert member, cover member and water retaining member.
Figure 5:
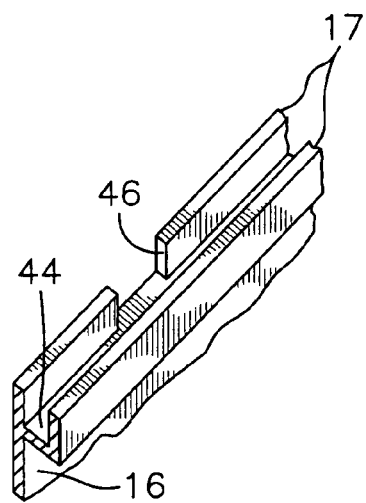
FIG. 5 is a partial view of the reversible steamer insert member showing a rim pair, channel and drain slot.
Figure 6:
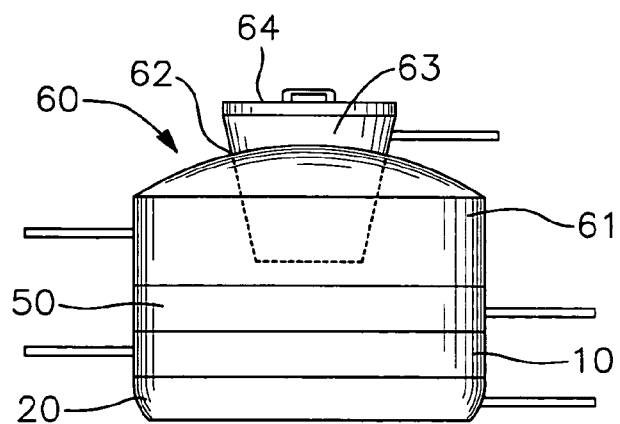
FIG. 6 is a view of a steamer cooking apparatus in stacked configuration, showing a water retaining member, a reversible steamer insert member, a riser member and a double boiler assembly.
Figure 7:
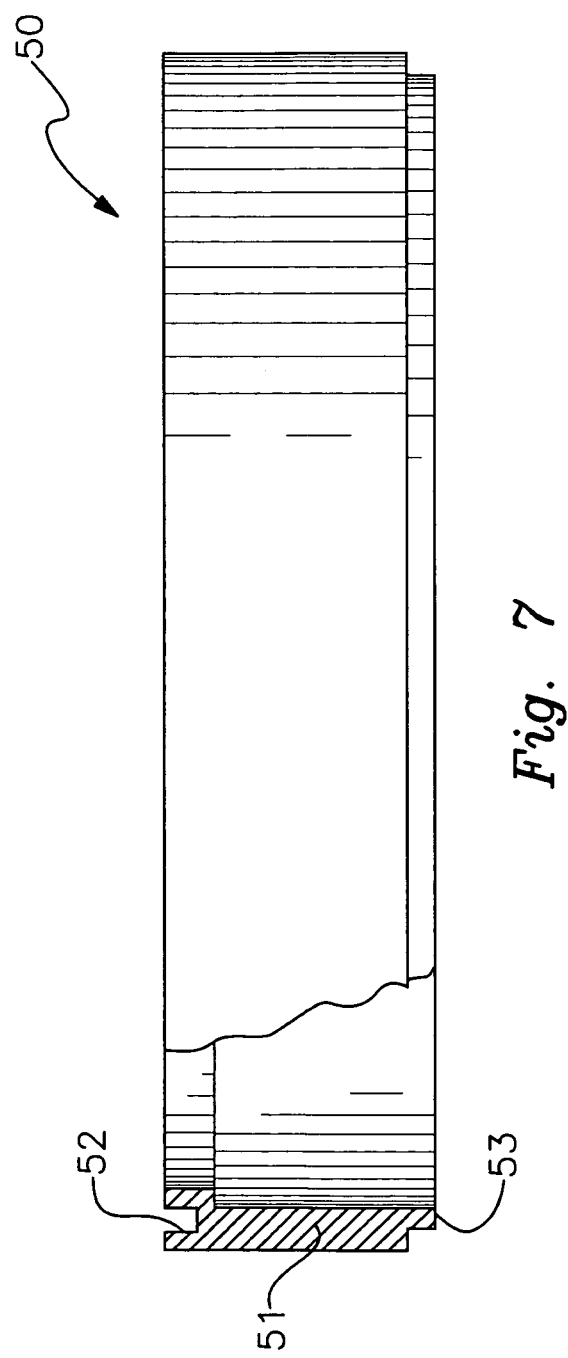
FIG. 7 is a partially exposed view of a riser member.

As shown in the drawings, the invention will now be described in detail with regard for the best mode and the preferred embodiment. In a most general sense, the invention is a steam cooking apparatus comprising a combination of members adapted to mate with, nest with, rest or receive each other in a stacked or vertical alignment, the combination allowing food to be disposed internally within the combination for cooking by steam generated within the apparatus.

In a basic embodiment the steam cooking apparatus comprises a water retaining member 20 that can be heated by placing the member onto the burner of a stove or is self-heating such that water retained within the member 20 is converted into steam, such as a cooking pan, pot, skillet, electric skillet or the like, a reversible steamer insert member 10 which supports the food during the cooking process, and a cover or lid member 30, the cover member 30 preferably having a handle 33 and one or more venting apertures 32 so as to allow a quantity of steam to escape. The venting apertures 32 may be provided with closure means to block or adjust the amount of steam allowed to vent from the steamer cooking apparatus.

The reversible steamer insert member 10 is positioned on or within the water retaining member 20, preferably in a mating or nesting arrangement, and the cover member 30 is preferably adapted to mate or nest with either the steamer insert member 10 or the water retaining member 20. While not critical to the invention, it is most preferred that the water retaining member 20, steamer insert member 10 and cover member 30 be structured to prevent accidental relative horizontal movement.

The reversible steamer insert member 10 has a generally planar main body 11 with first and second steaming surfaces 14 and 15, the main body 11 having a large number of perforations, apertures, holes, slots or the like 13 extending therethrough. In a preferred embodiment, the walls of the apertures 13 are non-cylindrical and inwardly disposed from each side such that the apertures 13 are narrower in the interior, which provides for easier cleaning. A handle 12 extends generally horizontally from the main body 11. The handle 12 may be permanently or removably mounted to the main body 11. The first steaming surface 14 is a generally flat base from which extend a plurality of annular upstanding forming walls 41, the forming walls 41 defining forming compartments 42 to receive ground beef, other chopped meats, vegetables, etc. such that patties do not need to be pre-formed but instead may be formed by pressing the food substance into the forming compartment 42. Preferably, the forming walls 41 are equal in height and interconnect such that areas of the first steaming surface 14 external to the forming compartments 42 define irregularly shaped cooking compartments 43 to retain and separate other items to be cooked. In like manner, the forming walls 41 themselves can function as food dividers. The second steaming surface 15 is a generally flat surface with no obstructions and no upstanding walls, such that larger items may be placed onto second steaming surface 15 for cooking.

The reversible steamer insert 10 is most preferably provided with mating or nesting means for positioning the steamer insert 10 in a spaced relationship to the bottom of the water retaining member 20, such that a quantity of water can be retained within the water retaining member 20 without the water directly contacting the main body 11 of the steamer insert member 10, and such that relative lateral or horizontal movement between the reversible steamer insert 10 and the water retaining member 20 is precluded, as si relative movement between the reversible steamer insert 10 and the cover member 30. Such nesting means may comprise for example legs extending from both sides of the main body 11 that will rest within the water retaining member 20, discrete extension members extending generally horizontally from the main body 11 adapted to rest on the upper rim 22 of the walls 21 of the water retaining member 20, or preferably and as shown, a peripheral wall 16 extending about the main body 11. The peripheral wall 16 extends beyond both the first and second steaming surfaces 14 and 15, and preferably comprises a first rim pair 17 and a second rim pair 18. The first rim pair 17 extend from the first steaming surface 14 and define a first channel 44 and the second rim pair 18 extend above the second steaming surface 15 to define a second channel 45. This structure provides the steamer apparatus with a secure stacking functionality, since the channels 44 and 45 receive the rims of the water retaining member 20 and the cover member 30 in a manner which precludes horizontal movement or sliding.

In another preferred embodiment, the inner members of the first and second rim pairs 17 and 18 are provided with drain slots 46, whereby condensation forming on the interior of the cover member 30 may drip back down into the water retaining member 20.

The steamer cooking apparatus may further comprise one or more peripheral riser members 50 mainly comprising and upstanding wall 51 with no or little internal structure. The riser members 50 provide for adjustment of the vertical spacing between the water retaining member 20, the reversible steamer insert member 10 and the cover member 30. For example, by positioning one or more riser members 50 between the cover member 30 and the steamer insert member 10, thicker food items may be prepared within the apparatus. The riser members 50 are preferably provided with nesting or mating structures similar to those of the water retaining member 20, the reversible steamer insert member 10 and the cover member 30 such that secured stacking with little to no horizontal shifting is present. For example, one rim of wall 51 may have a channel 52 and the other rim of wall 51 will be non-channeled flange 53. With this structure, the flange 53 of wall 51 may be placed into the upper channel 44 or 45 of rim pair 17 or 18, depending on which steaming surface 14 or 15 is uppermost. The channel 52 of wall 51 is then able to receive the lower rim of the cover member 30, or the non-channeled flange of another riser member 50 if additional height is needed. Likewise, plural riser members 50 may be utilized with plural steamer insert members 10 to provide plural cooking levels within the stacked apparatus.

In still another embodiment, the cover member 30 of the steamer cooking apparatus comprises a double boiler assembly 60 comprising an adapter member 61 similar in structure to cover member 30, the adapter member 61 having a large circular opening 62 that receives a removable pot member 63 with pot cover 64. With this structure, the steam produced in water retaining member 20 may be used to indirectly heat the double boiler pot member 63 in known manner.

It is understood that equivalents and substitutions for some elements set forth above may be obvious to those skilled in the art, and therefore the true scope and definition of the invention is to be as set froth in the following claims, the embodiments set forth above not being intended to limit the scope and definition of the invention.

We claim:

1. A steamer cooking apparatus comprising in combination:
   a water retaining member;
   a cover member; and
   a reversible steamer insert member having a first steaming surface, a second steaming surface and a peripheral wall surrounding said first and said second steaming surfaces, said first steaming surface having a plurality of annular upstanding forming walls defining circular forming compartments and in combination with said peripheral wall defining a plurality of irregularly shaped cooking compartments, said second steaming surface being generally flat and unobstructed with no upstanding walls, said first steaming surface and said second steaming surface being on opposite sides of said reversible steamer member, said reversible steamer insert member further comprising a plurality of apertures;
   said forming compartments structured such that disk-shaped food patties to be cooked are formed by pressing food product directly into said forming walls;
   said reversible steamer insert member positioned on said water retaining member, wherein said reversible steamer insert member may be so positioned with said first steaming surface facing up and said second steaming surface facing down or alternatively with said first steaming surface facing down and said second steaming surface facing up;

said cover member being positioned directly on and supported by said reversible steamer insert member.

2. The apparatus of claim 1, wherein said reversible steamer insert comprises first mating means for precluding relative horizontal movement between said reversible steamer insert and said water retaining member or between said reversible steamer insert and said cover, and wherein said reversible steamer insert further comprises second mating means for precluding relative horizontal movement between said reversible steamer insert and said water retaining member or between said reversible steamer insert and said cover member, said first and said second mating means being on opposite sides of said peripheral wall of said reversible steamer insert member;

wherein with said first mating means mating with said water retaining member said second mating means mates with said cover member, and wherein with said second mating means mating with said water retaining member said second mating means mates with said cover member.

3. The apparatus of claim 2, wherein said first mating means comprises a first rim pair defining a first channel and said second mating means comprises a second rim pair defining a second channel.

4. The apparatus of claim 3, further comprising at least one drain slot in each of said first and second rim pairs whereby condensed water may drain from said first or said second channel onto said first or said second steaming surface.

5. The apparatus of claim 1, further comprising at least one riser member, said riser member positionable between said reversible steamer insert member and said water retaining member or between said reversible steamer insert member and said cover member.

6. The apparatus of claim 5, wherein said cover member comprises a double boiler assembly.

7. The apparatus of claim 6, wherein said double boiler assembly comprises an adapter member having a circular opening, a pot member received within said circular opening and a pot cover.

8. The apparatus of claim 1, wherein said reversible steamer insert member apertures are non-cylindrical and narrower in the interior than on both said first and said second steaming surfaces.

9. A steamer cooking apparatus comprising in combination:

a water retaining member adapted to be heated so as to convert water into steam, said water retaining member having a wall and an upper rim;

a cover member; and a reversible steamer insert member having a first steaming surface, and a second steaming surface and a peripheral wall surrounding said first and said second steaming surfaces, said first steaming surface having a plurality of annular upstanding forming walls defining circular forming compartments and in combination with said peripheral wall defining a plurality of irregularly shaped cooking compartments, said second steaming surface being generally flat and unobstructed with no upstanding walls, said first steaming surface and said second steaming surface being on opposite sides of said reversible steamer member, said reversible steamer insert member further comprising a plurality of apertures; said forming compartments structured such that disk-shaped food patties to be cooked are formed by pressing food product directly into said forming walls;

said reversible steamer insert member further comprising a peripheral wall member having a first rim pair defining a first channel and a second rim pair defining a second channel, said first channel and said second channel being on opposite sides of said reversible steamer member;

said reversible steamer insert member removably mated with said water retaining member, wherein said reversible steamer insert member may be mated with said first steaming surface facing up or said second steaming surface facing up, wherein said upper rim of said water retaining member is received within either said first channel or said second channel;

said cover member removably mated with said reversible steamer insert member, wherein said cover member is received within said first channel or said second channel.

10. The apparatus of claim 9, further comprising at least one riser member, said at least one riser member comprising a wall having a channel and a flange, wherein said riser flange is adapted to be received by either said first or second channel of said reversible steamer insert member and said riser channel is adapted to receive said cover member, such that the distance between said reversible steamer insert member and said cover member may be changed by inserting said at least one riser member therebetween.

11. The apparatus of claim 10, wherein said cover member comprises a double boiler assembly.

12. The apparatus of claim 11, wherein said double boiler assembly comprises an adapter member having a circular opening, a pot member received within said circular opening and a pot cover.

13. The apparatus of claim 9, wherein said reversible steamer insert member apertures are non-cylindrical and narrower in the interior than on both said first and said second steaming surfaces.

14. The apparatus of claim 9, wherein said forming walls are equal in height.

15. The apparatus of claim 9, further comprising at least one drain slot in each of said first and second rim pairs whereby condensed water may drain from said first or said second channel onto said first or said second steaming surface.

16. A steamer cooking apparatus comprising in combination:

a water retaining member;

a cover member; and a reversible steamer insert member having a first steaming surface, a second steaming surface, a peripheral wall surrounding said first and said second steaming surfaces, and a plurality of annular upstanding forming walls disposed on said first steaming surface internally to said peripheral wall, a plurality of said annular upstanding forming walls abutting said peripheral wall and defining circular forming compartments, and at least one of said annular upstanding forming walls positioned interiorly on said first steaming surface separated from said peripheral wall and defining at least one other circular forming compartment;

said second steaming surface being generally flat and unobstructed with no upstanding walls, said first steaming surface and said second steaming surface being on opposite sides of said reversible steamer member, said reversible steamer insert member further comprising a plurality of apertures;

said circular forming compartments structured such that disk-shaped food patties to be cooked are formed by pressing food product directly into said forming walls;

said reversible steamer insert member positioned on said water retaining member, wherein said reversible steamer insert member may be so positioned with said first steaming surface facing up and said second steaming surface facing down or alternatively with said first steaming surface facing down and said second steaming surface facing up;

said cover member being positioned directly on and supported by said reversible steamer insert member.

17. The apparatus of claim 16, wherein said reversible steamer insert comprises first mating means for precluding relative horizontal movement between said reversible steamer insert and said water retaining member or between said reversible steamer insert and said cover, and wherein said reversible steamer insert further comprises second mating means for precluding relative horizontal movement between said reversible steamer insert and said water retaining member or between said reversible steamer insert and said cover member, said first and said second mating means being on opposite sides of said peripheral wall of said reversible steamer insert member;

wherein with said first mating means mating with said water retaining member said second mating means mates with said cover member, and wherein with said second mating means mating with said water retaining member said second mating means mates with said cover member.

18. The apparatus of claim 17, wherein said first mating means comprises a first rim pair defining a first channel and said second mating means comprises a second rim pair defining a second channel, said first and said second rim pairs positioned on said peripheral wall.

19. The apparatus of claim 18, further comprising at least one drain slot in each of said first and second rim pairs whereby condensed water may drain from said first or said second channel onto said first or said second steaming surface.

* * * * *